United States Patent [19]

Byrd et al.

[11] 4,403,075

[45] Sep. 6, 1983

[54] FLAME RESISTANT COMPOSITION CONTAINING POLYMERIC PHOSPHORYLATED AMIDES

[75] Inventors: Norman R. Byrd, Villa Park; Daniel C. Peek, Long Beach, both of Calif.

[73] Assignee: McDonnell Douglas Corporation, Long Beach, Calif.

[21] Appl. No.: 190,742

[22] Filed: Sep. 25, 1980

[51] Int. Cl.$^3$ .................. C08L 85/02; C08L 79/00; C08L 63/02

[52] U.S. Cl. .................. 525/418; 428/426; 428/435; 428/436; 428/442; 525/186; 525/188; 525/420; 525/422; 525/435; 525/437; 525/474; 525/504; 525/523; 525/528

[58] Field of Search .............. 525/538, 434, 435, 422, 525/188, 437, 418, 474, 480, 509, 523, 504, 420, 186

[56] References Cited

U.S. PATENT DOCUMENTS

| | | | |
|---|---|---|---|
| 2,719,134 | 9/1955 | Coover | 525/188 |
| 3,116,268 | 12/1963 | Farago | 525/538 |
| 3,377,409 | 4/1968 | McConnell et al. | 525/538 |
| 4,067,897 | 1/1978 | Ducloux | 528/322 |

OTHER PUBLICATIONS

Chemical Abstracts, vol. 86, No. 86: 190791e; Paciorek et al., (1977).

*Primary Examiner*—Wilbert J. Briggs, Sr.
*Attorney, Agent, or Firm*—Max Geldin

[57] ABSTRACT

Highly fire resistant composites or laminates particularly applicable as structural components in aircraft, e.g. in the engine nacelle, as part of the acoustic panel-fire wall structure, and capable of withstanding a 2,000° F. flame temperature, comprising incorporating an additive in the form of a polymeric phosphorylated amide, into a resin, e.g., a polyimide or an epoxy resin, such additive being soluble in the resin. The resulting resin containing the additive is then applied to or impregnated into a substrate such as glass fiber cloth or graphite fiber, to form a composite structure which is then cured. The resulting cured composite when subjected to high temperatures of the order of, e.g., a 2,000° F. flame temperature, forms a resin char of reduced thermal conductivity which holds the fibers of the laminate together and maintains the structural stability and integrity of the laminate.

63 Claims, No Drawings

FLAME RESISTANT COMPOSITION CONTAINING POLYMERIC PHOSPHORYLATED AMIDES

BACKGROUND OF THE INVENTION

This invention relates to thermal insulation materials having high fire resistance and low thermal conductivity, and is particularly concerned with resin compositions and composites, particularly polyimide or epoxy resin compositions, and composites formed therewith, incorporating certain additives to substantially increase fire resistance, and which are particularly applicable as structural components, e.g., as an acoustic panel-fire wall structure in aircraft.

Considerable effort and funds have been expended over the past several years in programs to develop the potential of organic composite materials for use in aircraft structures, among others. These studies have shown that the use of high-stiffness, high-strength composites, such as graphite-epoxy, can reduce the weight of structural components by as much as 50%, and thus improve structural efficiency while providing significant benefits in cost and performance. The most commonly employed class of resins for this use, depending upon the particular application, are epoxides, polyesters, phenolics and polyimides.

Thus, using graphite-polyimide as the composite, a structural component is available that has good strength, is lightweight, and has some fire resistance, in that the polyimide will not readily burn at low temperatures. However, at 2,000° F. flame conditions, the polyimide will burn and decompose to form a char on the flame side. This char, though, is so thin that it will allow heat to get through to the backside and decompose the resin. Thus, this could create a hazard due to the possibility of the decomposition products igniting, thereby generating a fire on the backside, even though the parent polymer e.g. polyimide, does not readily burn. Furthermore, with the resin volatilizing, or burning away, the heat transfer through the backside is sufficient to ignite other combustible articles in contact with this fire wall. Therefore, a need exists for a non-burning resin composite that has good stability, is a good char former, and has low thermal conductivity.

There are two problem areas where such a non-burning resin composition can be used on an aircraft: (1) in the engine nacelle, as part of the acoustic panel-fire wall structure, and for this application, polyimides are particularly desirable; and (2) as part of the external surface where graphite-epoxies are the usual materials of construction.

In regard to this latter case, instances have been reported of the resultant degradation of graphite-epoxy composites due to fire and the consequent breaking up of the graphite fibers and the spreading of these fibers to electrical equipment. Thus, any method that is developed to contain these short conductive fibers and prevent their spreading would be of great value.

Therefore, the use of graphite fiber-resin composites depends not only on the strength of the composite due to the presence of the graphite, but on the fire resistance of the resin, as well. There are many additives that, when incorporated into the resin, will act as fire retardants. Some, such as alumina trihydrate, ammonium phosphate, and zinc borate, are solids that offer excellent fire resistance. The hydrated alumina will offer fire protection by giving off water at a relatively low temperature; however, this temperature is usually around the processing temperature of some resins, e.g., polyimides. Ammonium phosphate and zinc borate are effective at higher temperatures, but, as with the hydrated alumina, these are all solid particulates, and they adversely affect the mechanical properties of the laminate, i.e. cause increase in laminate thickness with a consequent decrease in strength. Many other additives are available that are soluble in the resin, but they are good fire retardants only at relatively low fire temperatures, i.e. around 500° F. to 1,000° F.

There accordingly has arisen the need for a substance which can be incorporated into the resin and which will give protection to the resin at high temperatures, e.g., of the order of 2,000° F., to provide a resin composition which is non-burning and has a low thermal conductivity, and wherein such substance functions as a char stabilizer. However, use of resin-soluble additives for this purpose such as the reaction product of hydroquinone and phenylphosphonic dichloride, although alleged to be a fire retardant when impregnated into clothing (Ger. Offen. Nos. 2,236,038, Jan. 31, 1974; 2,236,039, Jan. 31, 1974; 2,346,787, Apr. 3, 1975; U.S. Pat. Nos. 3,853,819, 3,894,986; 3,900,444; and 3,941,752), will not withstand temperatures much above 1,000° F. Thus, for aircraft utilization, whether in the engine nacelle, or on the external skin, where burning fuel fires could result in temperatures around 2,000° F., any organic-soluble additive that can result in a stabilized char upon burning is needed.

It has been known that phosphorus derivatives make good fire retarding agents, as exemplified by the following: U.S. Pat. Nos. 3,941,752; 3,900,444; 3,894,986; 3,853,819; 2,577,281; 2,642,413; 2,716,639; 3,450,677; 3,640,823; 3,685,974; and 3,712,789. U.S. Pat. No. 2,642,413 uses an organo-phosphonic acid diamide and forms polymers thereof with ureas. U.S. Pat. No. 3,450,677 prepares polymers from a diamine and an organic phosphite, phosphonite or phosphonic dihalide. The resulting materials are then treated with isocyanates to prepare polyureas, but are not employed as additives for resin composites.

However, much of the work with fire retardant compositions has been concerned with incorporation of various phosphorylated derivatives into polyurethanes, or fiber forming compositions. Furthermore, in most cases, these compositions have had to be stable to relatively low flame conditions, such as burning wood, e.g., up to about 800°–1,000° F. When incorporated into a glass cloth polyimide resin laminate and burned at 2,000° F. (the FAA requirement for burn-through stability), they did not pass.

However, certain compounds have been used as fire retardants that were found to show excellent fire resistance to a 2,000° F. flame. Notable among these was ammonium phosphate.

Accordingly, one object of the invention is to provide resin compositions and composites having high fire resistance and low thermal conductivity. Another object is the provision of compositions and composites of the above type having utility as a fire barrier, particularly applicable as an aircraft structural component, e.g., an acoustic panel-firewall structure capable of withstanding high temperature, e.g., a 2,000° F. flame temperature. A still further object is the provision of resin compositions, particularly polyimide and epoxy compositions, and composites produced therefrom, such as polyimide-glass fabric or epoxy-glass fabric composites or laminates, having incorporated therein a substance which substantially increases the fire resistance of the resin and reduces its thermal conductivity, substantially without adversely affecting the physical and mechanical properties of the composite, and which functions to stabilize the resin or resin char, at high temperatures, e.g., a 2,000° F. flame temperature, and maintains the structural integrity of the composite.

SUMMARY OF THE INVENTION

The above objects and advantages are achieved, according to the invention, by incorporating into a resin such as a polyimide or an epoxy, a polymeric phosphorylated amide, particularly in the form of an amide of various organic phosphonic and thiophosphonic acids or their esters with various diamines, as described in greater detail below. Such composition is then applied to a suitable substrate, such as glass cloth, to form a "prepreg," and the resin, such as polyimide or epoxy, is cured to obtain a fire resistant composite or laminate.

The additive incorporated into the resin, as noted above, can be, for example polymers of organic phosphonic and thiophosphonic acid amides, and which can be substituted by aliphatic or aromatic groups. Such compounds are soluble in the above noted resins, e.g. polyimide or epoxy, and upon curing of the resin composition and composite containing such compounds or additives, there is no adverse effect on the mechanical properties of the cured composite or laminate. Such composite offers substantial protection against burning, particularly at high temperatures, e.g., at 2,000° F. and above. At such temperatures, e.g. a 2,000° F. flame condition, the presence of a sufficient amount of the above additive in the composite results in stabilization of the resin char which is formed. This enables such char to hold the fibers of the substrate, e.g. glass or graphite fibers, together and maintain the structural stability and integrity of the composite or laminate. The resin char also has reduced thermal conductivity due to the heat dissipation capability of the carbonaceous residue.

The polymeric phosphorylated amide according to the invention, preferably is incorporated into a polyimide or epoxy resin. Such polyimide can be either a condensation type polyimide or an addition type polyimide. Epoxy resins which can be employed include the epoxy resin produced by condensation of bisphenol A and epichlorohydrin. Other resins into which the polymeric phosphorylated amide additive of the invention also can be incorporated include polybenzimidazoles, polyesters, polyquinoxylines, polyacrylates, phenolic polymers and silicones, in order to enhance their fire resistance. The polybenzimidazole is the reaction product of 2,2'-diamino benzidine with the phenyl ester of p,p'-diphenyl ether benzoic acid; the polyquinoxyline is the reaction product of 2,2'-diamino benzidine with a bisbenzene glyoxal. Examples of phenolic polymers which can be employed are the phenol-formaldehyde resins, and examples of silicones are dimethyl polysiloxanes and methyl phenyl polysiloxanes. Examples of polyacrylates are polymethyl acrylate and polymethyl methacrylate. It has been found that the polymeric phosphorylated amide additives are capable of chemically bonding to the above resins and become an integral part of the cured resin composition, and not merely an admixture of the additive and the resin. Thus, the additive cannot be leached out of the cured composition.

The polymeric phosphorylated amide additive such as, for example, polyphenyl phosphonic polyamide, can be added to the resin, e.g. polyimide, in varying proportions, e.g. ranging from about 5 to about 40 parts, preferably about 10 to about 40 parts, per 100 parts of resin, e.g. polyimide, by weight, to produce the resin compositions of the invention.

Substrates to which the resin compositions of the invention can be applied, include graphite fibers or fabric, glass fibers or fabric, particularly high silica glass fabric such as the material marketed as "Refrasil", low melting point metals such as aluminum, and the like. The resin composition containing the polymeric phosphorylated amide additives, e.g. polyimide containing a poly phenyl phosphonic polyamide, and substrate, can be formed into several plies to produce a composite or laminate, and cured.

In addition to use in aircraft engines, the composites of the invention containing the above additive can also be used as fire walls in homes, in autos (between the passenger compartment and either the engine or the gas tank), in trains, etc.

DESCRIPTION OF PREFERRED EMBODIMENTS

As previously noted, the additive employed according to the invention, i.e. the polymeric phosphorylated amide, can be employed in an amount ranging from about 5 to about 40 parts, per 100 parts of resin or resin solids, by weight, but preferably is employed in an amount ranging from about 10 to about 40 parts, per 100 parts of resin or resin solids, by weight. The additive employed can be either a homopolymer or a copolymer. For the homopolymer, the general formula is:

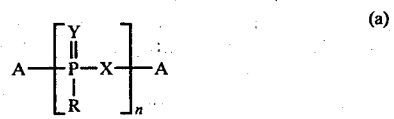

where Y is O or S; R is H, alkyl, with straight chain or branched chain, and generally containing from about 1 to about 6 carbon atoms, e.g., methyl, ethyl, propyl, isopropyl, butyl, isobutyl, pentyl, hexyl, and isohexyl; cycloalkyl, generally containing from about 5 to about 7 carbon atoms, such as, for example, cyclopentyl, cyclohexyl, methylcyclohexyl; aryl, generally containing from about 6 to about 14 carbon atoms, such as phenyl, xylyl, tolyl, naphthyl, methylnaphthyl and ethylnaphthyl; the corresponding halogenated alkyl and aryl groups including, for example, the chlorinated, brominated and fluorinated derivatives, e.g. trichloromethyl and chlorophenyl, nitroaryl containing about 6 to about 14 carbon atoms such as nitrophenyl, nitrotolyl, and the like; heterocyclic containing 5 to 6 members in the heterocyclic nucleus, and O, N or S as hetero atoms, e.g., furanyl, pyridyl, pyrrolyl, quinolyl and thiophene; amino, alkylamino containing from about 1 to about 8 carbon atoms in the alkyl group, e.g., methylamino, ethylamino, dimethylamino, diethylamino, arylamino containing from about 6 to about 14 carbon atoms such as phenylamino and naphthylamino, oxyalkyl containing from 1 to about 4 carbon atoms such as oxymethyl, oxyethyl, oxypropyl, and oxyaryl containing about 6 to about 14 carbon atoms such as oxyphenyl, oxytolyl and oxynaphthyl, and the like; X is $-(NR_1-R_2)_cNR_1-$, where $R_1$ is H, alkyl, cycloalkyl, aryl, all as described above, acyl containing about 1 to about 7 carbon atoms such as formyl, acetyl, propionyl, and including cycloalkylacyl such as cyclohexylacyl, aroyl containing about 7 to about 11 carbon atoms such as benzoyl, naphthoyl and the like; and $R_2$ is alkylene of from about 2 to about 14 atoms, such as ethylene, propylene, and the like, arylene of from about 6 to about 14 carbon atoms, such as divalent phenylene, biphenylene, naphthylene and anthracene; divalent carbonyl and thiocarbonyl, $>C=NH$, cycloalkylene of from about 6 to about 8 carbon atoms, such as cyclohexylene; and where c is 0 to 2; n is 1 to about 1,000, usually 1 to about 100; and A is the terminal group $-NR_1R_3$ where $R_3$ has the same values as $R_1$, and $R_1$ and $R_3$ can be the same or different.

For the copolymers the general formula is:

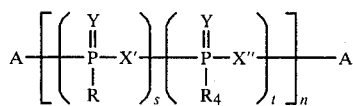
(b)

where A and Y are the same as for the homopolymer; $R_4$ can have any of the values described above for R, and R and $R_4$ can be the same or different, and X' and X" can have any of the values described above for X, and X' and X" can be the same or different, and where the relationship between R and $R_4$, and X' and X" is such that when R and $R_4$ are different, X' and X" are the same, and when R and $R_4$ are the same, X' and X" are different; s and t can be the same or different and where s and t are from about 1 to about 10, and n has the same values noted above for the homopolymer.

Preferred additives are those wherein R is hydrogen, alkyl, aryl or the chlorinated derivatives thereof.

Another preferred class of polymers according to the invention are the poly phosphinohydrazides, poly phosphinoguanides and their thio analogs. Such polymers have the following recurring structural units:

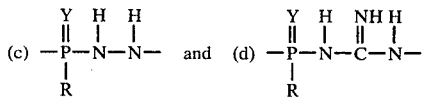

where Y and R have the values defined above.

Examples of specific polymeric additives and their recurring structural units, according to the invention are:

TABLE
POLYMERIC PHOSPORYLATED AMIDES (1) Poly (Phenyl Phosphonic Polyamide)

(2) Poly (p-Phenylenediamine Phenyl Phosphonic Acid Amide)

(3) Poly (m-Phenylene Diamine Phenyl Phosphonic Acid Amide)

(4) Poly (1,8-Naphthalene Diamine Phenyl Phosphonic Amide)

(5) Poly (p-Phenylene Diamine Phenylthiophosphonic Amide)

(6) Poly (p-Phenylene Diamine Amido Methyl Phosphonate)

TABLE-continued
POLYMERIC PHOSPORYLATED AMIDES

| # | Structure | Name |
|---|---|---|
| (7) | —P(=O)(H)—N(H)—C(=O)—N(H)—P(=O)(H)—N(H)—C(=O)—N— | Poly (Urea Phosphinate) |
| (8) | —P(=O)(H)—N(H)—C(=O)—N(H)—C(=O)—N(H)—P(=O)(H)—N(H)—C(=O)—N(H)—C(=O)—N— | Poly (Biuret Phosphinate) |
| (9) | —P(=O)(CH₃)—N(H)—C(=O)—N(H)—P(=O)(CH₃)—N(H)—C(=O)—N— | Poly (Urea Methyl Phosphonate) |
| (10) | —P(=O)(CH₃)—N(H)—C(=O)—N(H)—C(=O)—N(H)—P(=O)(CH₃)—N(H)—C(=O)—N(H)—C(=O)—N— | Poly (Biuret Methyl Phosphonate) |
| (11) | —P(=O)(CCl₃)—N(H)—C(=O)—N(H)—P(=O)(CCl₃)—N(H)—C(=O)—N— | Poly (Urea Trichloromethyl Phosphonate) |
| (12) | —P(=O)(CCl₃)—N(H)—C(=O)—N(H)—C(=O)—N(H)—P(=O)(CCl₃)—N(H)—C(=O)—N(H)—C(=O)—N— | Poly (Biuret Trichloromethyl Phosphonate) |
| (13) | —P(=O)(H)—N(H)—CH₂—CH₂—N(H)—P(=O)(H)—N(H)—CH₂—CH₂—N(H)— | Poly (Ethylenediamine Phosphinate) |
| (14) | —P(=O)(CH₃)—N(H)—CH₂—CH₂—N(H)—P(=O)(CH₃)—N(H)—CH₂—CH₂—N(H)— | Poly (Ethylenediamine Methyl Phosphonate) |
| (15) | —P(=O)(CCl₃)—N(H)—CH₂—CH₂—N(H)—P(=O)(CCl₃)—N(H)—CH₂—CH₂—N(H)— | Poly (Ethylenediamine Trichloromethyl Phosphonate) |
| (16) | —P(=O)(CH₃)—N(H)—C(=NH)—N(H)—P(=O)(CH₃)—N(H)—C(=NH)—N— | Poly (Guanidine Methyl Phosphonate) |
| (17) | —P(=O)(CH₃)—N(H)—C₆H₃(NH₂)—N(H)—P(=O)(CH₃)—N(H)—C₆H₃(NH₂)—N(H)— | Poly (Phosphorylated Melamine) |
| (18) | —P(=O)(H)—N(H)—N(H)—P(=O)(H)—N(H)—N(H)— | Poly (Hydrazyl Phosphinate) |
| (19) | —P(=O)(CH₃)—N(H)—N(H)—P(=O)(CH₃)—N(H)—N(H)— | Poly (Hydrazyl Methyl Phosphonate) |
| (20) | —P(=O)(CCl₃)—N(H)—N(H)—P(=O)(CCl₃)—N(H)—N(H)— | Poly (Hydrazyl Trichloromethyl Phosphonate) |

| | POLYMERIC PHOSPORYLATED AMIDES | |
|---|---|---|
| (21) | structure with -P(=O)(CCl₃)-N(H)-pyridyl-N(H)-P(=O)(CCl₃)-N(H)-pyridyl-N(H)- | Poly (2,6-Diaminopyridyl Trichloromethyl Phosphonate) |
| (22) | -P(=O)(H)-N(H)-N(H)-P(=O)(CH₃)-N(H)-N(H)- | Poly (co-Hydrazyl Methyl Phosphonate Phosphinate) |
| (23) | -P(=O)(CCl₃)-N(H)-CH₂-CH₂-N(H)-P(=O)(CCl₃)-N(H)-N(H)- | Poly (co-Ethylenediamine Hydrazyl Trichloromethyl Phosphonate) |
| (24) | -P(=O)(CH₃)-N(H)-CH₂-CH₂-N(H)-P(=O)(CH₃)-N(H)-N(H)-P(=O)(CH₃)-N(H)-CH₂-CH₂-N(H)-P(=O)(CH₃)-N(H)-N(H)- | Copolymer from Dimethyl Methyl Phosphonate plus Ethylenediamine and Hydrazine (Hydrate) |

The compounds of the invention above can be prepared in various ways, as illustrated in the examples below.

EXAMPLE I

The 1:1 molar reaction of phosphonic dichlorides with diamines is given in the representative reaction of phenylphosphonic dichloride with para-phenylene diamine, below. Two methods were used. One involved use of triethylamine as the acid acceptor and the other a high boiling solvent, such as bromobenzene, to decompose the amine hydrochloride formed. In the first case, one mole of para-phenylenediamine and two moles of triethylamine were mixed in one liter of methylene chloride. One mole of phenylphosphonic dichloride was then added dropwise. An exothermic reaction occurred, and after the addition was complete, the mixture was heated to reflux for two hours. The solvent was evaporated and the resultant solid slurried in about two liters of warm water to remove the triethylamine hydrochloride. The polymer was filtered under vacuum and the dried polymer had a softening point around 240° C.

The second method used the same ratios of reactants, but bromobenzene was used as a solvent, with no triethylamine. In this system, the mixture was heated to reflux for about 40 hours to remove the HCl. This product had a softening point around 225° C.

EXAMPLE II

Other substituted diamides were also prepared, and representative of this type of reaction are the reactions of phosphonic acid esters with various diamines, e.g. urea, guanidine, hydrazine and ethylene diamine, among others. Thus, one mole of dimethyl methylphosphonate [CH₃P(O)(O CH₃)₂] and one mole of urea were mixed in 130 mls of xylene. The reaction was heated to 130° C. for 48 hours and the xylene decanted off to leave behind an extremely viscous polymer. Another similar reaction was that between 0.5 moles of the dimethyl methylphosphonate and 0.5 moles of ethylene diamine in 250 mls of methylene chloride. After all the diamine had been added dropwise, the reaction mixture was allowed to stand 72 hours at room temperature. The methylene chloride was evaporated off and the reaction mixture heated first to 65° C. for 4 hours, then 120° C. for 4 hours. A viscous polymer resulted.

EXAMPLE II-a

Dimethylphosphite, in the amount of 336.5 g (3.04 moles), was dissolved in 1 liter of xylene in a 2-liter resin kettle fitted with a stirrer, Claisen takeoff head, and a condenser. The mixture was cooled with a dry ice-ethylene glycol bath and 155 g (3.1 moles) of hydrazine hydrate were added slowly. The mixture was allowed to warm to room temperature and left to stir overnight. It was then heated to reflux (60° C.) for 48 hours, at which time alcohol and water were distilled off until the temperature rose to 140° C. It was refluxed at this temperature for two hours and then about 600 mls of xylene were distilled off. The remaining solution was transferred to a beaker, cooled, and the excess xylene was decanted off. The beaker was heated in a vacuum oven to remove the last trace of xylene to yield a viscous, slightly yellow poly (phosphinohydrazide), where Y is O and R is H in formula (c) above.

EXAMPLE II-b

Dimethyl methylphosphonate, in the amount of 620.4 g (5 moles), was placed in a 2-liter resin kettle, equipped as above. It was cooled in a dry ice-ethylene glycol bath and 251 g (5 moles) hydrazine hydrate were slowly added. The mixture was left to stir overnight and then heated to distill off the alcohol and water. The residue was a very viscous, light yellow product, poly(methylphosphinohydrazide), where Y is O and R is CH₃ in formula (c) above.

The phosphorylated amide additives can be added to the resin, e.g. polyimide, in the required amount, and the resulting mixture applied to the substrate such as graphite fabric or glass fabric, to form a composite or laminate utilizing, e.g. a plurality of fiberglass or graphite cloth plies. The composite is heated at elevated temperature ranging from about 200° to about 350° F. for curing, usually, although not necessarily, followed by a post curing operation at higher temperatures, e.g. ranging from about 400° to about 600° F.

The polymeric phosphorylated amide additive is added to the resin, e.g. polyimide, or such additive can be first incorporated in a solvent such as N-methyl pyrrolidone, and the resulting solution is then employed to impregnate the substrate such as graphite fabric or glass cloth, to form a composite or laminate, which is then cured as noted above.

The cured composites or laminates are subjected to flame tests employing a burner flame at a temperature of 2,000° F. In these tests the sample composite is mounted vertically, and the flame is impinged on the front face of the composite or laminate, and the temperature of the front face at 2,000° F. is monitored by a thermocouple. Under such conditions samples with substantially reduced burn-off areas on the back face of the composite or laminate after exposure to the 2,000° F. flame for 15 minutes show stabilization and thermal stability of the resin char and reduced thermal conductivity of the char, due to the presence of the polymeric phosphorylated amide additive.

The following are examples of practice of the invention:

EXAMPLE III 30 grams of the product prepared in Example I, viz, the polymer obtained from the reaction of phenylphosphonic dichloride with para-phenylene diamine, was dissolved in 135 grams of Skybond 703 polyimide varnish (a condensation type polyimide marketed by Monsanto as a 67 percent solids solution). The resulting solution was used to impregnate 8 plies of a 9-inch square 181 Fiberglass cloth (marketed by Owens Corning).

The resulting resin impregnated glass cloth laminate was vacuum bagged and maintained at 28 inches of mercury vacuum, and initially heated for one hour at 175° F. The temperature was then increased over a period of 3 hours to 350° F. and maintained at that temperature for about 2½ hours. The laminate was then removed from the vacuum bag and post-cured at a temperature of 550° F. for 4 hours.

Skybond 703 is usually sold as a polyamic acid varnish which is converted to a polyimide during heating and curing. However, Skybond 703 is usually referred to as the "polyimide varnish," even though it requires curing to convert it to the polyimide.

Samples of the resulting cured polyimide glass fabric laminate, and samples of a polyimide-impregnated glass laminate control employing the same amount of polyimide and using the same number of plies of 181 Fiberglass cloth, as for producing the polyimide glass fabric laminate above containing the additive of the invention, and cured by the procedure described above, were subjected to a Meeker burner flame maintained at 2,000° F. by means of a thermocouple, for a period of 15 minutes.

For the polyimide-glass fabric laminate control a large burn-off area was observed on the back, or rear face, of the laminate resulting from almost complete volatilization of resin and showed considerable delamination. Additionally, the backside temperature was around 1,200° F. On the other hand, for the polyimide impregnated glass fabric laminate containing the phenylphosphonic para-phenylene diamine polymer of the present example, essentially no burn-off areas on the back face of such polyimide glass laminate were observed, and the backside temperature was around 500° F.

This example accordingly shows that the resin char formed at the 2,000° F. flame temperature with the polyimide glass laminate of the invention containing the polymeric phosphorylated amide additive can be stabilized, and the resin char has reduced thermal conductivity. Thus, it can be seen that the presence of the polymeric phosphorylated amide additive in the resin stabilizes the char formed, and reduces the resin burn-off on the back face of the laminate as well as reducing the thermal conductivity of the char.

EXAMPLE IV

The procedure of Example III was repeated except that 30 grams of poly phenylphosphonic polyamide was used in place of the polymer obtained from the reaction of phenylphosphonic dichloride with para-phenylene diamine. The polyphenylphosphonic polyamide is obtained from a reaction of phenyl phosphonic dichloride with ammonia followed by heating this product to split out ammonia to form the polyphenylphosphonic polyamide having the recurring structural unit

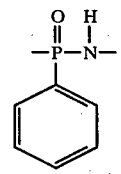

There is essentially no rein burn-off on the rear side of polyimide-glass cloth laminate treated with this compound, as opposed to the untreated polyimide control of Example III, and the backside temperature was around 450° F.

EXAMPLE V

The procedure of Example IV was repeated using 30 grams of the polymeric phosphorylated amide of Example IV in 100 grams of Epon 828 Epoxy resin.

EXAMPLE VI

The procedure of Example III was followed, except that 30 grams of a polymeric 1:1 reaction product of meta phenylenediamine and phenyl phosphonic dichloride was used in place of the 1:1 reaction product of phenylphosphonic dichloride and para-phenylene diamine of Example I. A product was obtained that showed no resin burn-off in the rear, and the backside temperature was around 600° F.

EXAMPLE VII

The procedure of Example III was repeated using 30 grams of the same polymer in 100 grams of Epon 828 epoxy resin. The results were similar to Example VI.

EXAMPLE VIII 30 grams of the polymer obtained from a 1:1 reaction between para phenylenediamine and phenyl thiophosphonic dichloride was added to 135 grams of the polyimide (Skybond 703), followed by impregnating the composition into 8 plies of a 9-inch square of 181 Fiberglass cloth (marketed by Owens Corning), and curing the laminate as in Example III. The resulting cured laminate was subjected to a 2,000° F. Meeker burner flame for 15 minutes. There was essentially no resin burn-off, and the backside temperature was around 500° F.

EXAMPLE IX

The procedure of Example III was repeated using 30 grams of the polymer prepared by reacting one mole of urea with one mole of dimethylphosphite, in place of the polymeric phosphorylated amide of Example III. There was essentially no resin burn-off, and the backside temperature was around 490° F.

EXAMPLE X

The procedure of Example IX was repeated except that 30 grams of the urea/dimethylphosphite polymer was used with 90 grams of Epon 828 epoxy. The results obtained were similar to Example IX.

EXAMPLE XI

The procedure of Example IX was repeated, but using 15 grams of the polymer prepared by reacting one mole of urea with one mole of dimethyl methylphosphonate, in place of the urea/dimethylphosphite polymer of Example IX. The results obtained were essentially the same as those of Example IX.

EXAMPLE XII

The procedure of Example IX was repeated, but using 40 grams of the polymer prepared by reacting one mole of urea with one mole of diethyl trichlorophosphonate, in place of the urea/dimethylphosphite polymer of Example IX. The results obtained were similar to those obtained in Example IX.

EXAMPLE XIII

The procedure of Example IX was repeated, but using 10 grams of the polymer prepared in Example IIa in place of the urea/dimethylphosphite polymer of Example IX. The results obtained were similar to those obtained in Example IX.

EXAMPLE XIV

The procedure of Example XIII was repeated, but using 40 grams of a product obtained from the reaction of two moles of hydrazine hydrate with one mole of dimethylphosphite, in place of the hydrazine/dimethylphosphite polymer of Example IIa. It should be noted that heating the reaction product of two moles of hydrazine hydrate with one mole of dimethylphosphite results in the elimination of hydrazine and/or ammonia to form a polymeric derivative. The results obtained were similar to those obtained in Example XIII.

EXAMPLE XV

The procedure of Example XIII was repeated except that 40 grams of the hydrazine/dimethylphosphite polymer was used with 135 grams of a phenolic polymer of 100 percent solids (Plyophen 23-169, a product of Reichold Chemical Co.) The results obtained were similar to Example XIII.

EXAMPLE XVI

The procedure of Example XIII was repeated except that 32 grams of the hydrazine/dimethylphosphite polymer was used with 90 grams of Epon 828 epoxy. The results obtained were similar to Example XIII.

EXAMPLE XVII

The procedure of Example XIII was repeated except that 40 grams of a copolymer prepared from the reaction of one mole of hydrazine hydrate with 0.5 mole of dimethylphosphite and 0.5 mole of dimethylmethyl phosphonate was used in place of the hydrazine/dimethylphosphite polymer of Example XIII. The results obtained were similar to Example XIII.

EXAMPLE XVIII

The procedure of Example XIII was repeated except that 40 grams of a polymer prepared by reacting one mole of guanidine with one mole of dimethylmethylphosphonate was used in place of the hydrazine/dimethylphosphite polymer of Example XIII. The results obtained were similar to those obtained in Example XIII.

EXAMPLE XIX

The procedure of Example XIII was repeated except that 40 grams of a polymer prepared by reacting one mole of ethylenediamine with one mole of diethylaminophosphonic dichloride was used in place of the hydrazine/dimethylphosphite polymer of Example XIII. The results obtained were similar to those obtained in Example XIII.

From the foregoing, it is seen that the invention provides a fire barrier composition and composite having high fire resistance and low thermal conductivity, by incorporating therein additives in the form of certain polymeric phosphorylated amides, and which function to stabilize the char formed from the resin at high temperatures, e.g. a 2,000° F. flame temperature, thereby permitting the char to hold the glass or graphite fibers of a fibrous substrate, such as fiberglass cloth, together and maintain the structural stability and integrity of the composite or laminate.

Since various modifications and changes will occur to those skilled in the art within the spirit of the invention, the invention is not be taken as limited except by the scope of the appended claims.

What is claimed is:

1. A fire resistant composition having low thermal conductivity, comprising a mixture of an epoxy resin and a polymeric phosphorylated amide as an additive, said additive being solublized in said resin and ultimately providing a homogeneous composition capable of being permanently bonded to a structural substrate to improve char characteristics and provide low thermal conductivity thereto and to permit such substrate to maintain structural integrity thereof when employed in an amount sufficient to form a stabie resin char upon being heated to an elevated temperature of about 2,000 degrees F., said polymeric phosphorylated amide being selected from the group consisting of homopolymers and copolymers having the following general formulas, respectively:

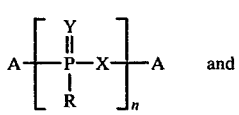 (a)

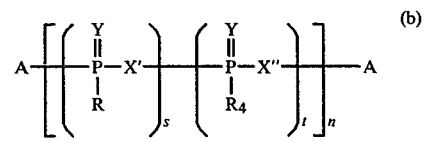 (b)

where Y is O or S; and R is selected from the group consisting of H, alkyl containing from about 1 to about 6 carbon atoms, cycloalkyl containing from about 5 to about 7 carbon atoms, aryl containing from about 6 to about 14 carbon atoms, the corresponding halogenated alkyl and aryl groups, nitroaryl containing about 6 to about 14 carbon atoms, heterocyclic containing 5 to 6 members in the heterocyclic nucleus and O,N or S as hetero atoms, amino, alkylamino containing from about 1 to about 8 carbon atoms in the alkyl group, arylamino containing from about 6 to about 14 carbon atoms, oxyalkyl containing from about 1 to about 4 carbon atoms, and oxyaryl containing about 6 to about 14 carbon atoms; X is selected from the group consisting of —HN— and

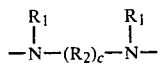

where $R_1$ is selected from the group consisting of H, alkyl with straight chain or branched chain and having from about 1 to about 6 carbon atoms, cycloalkyl having from about 5 to about 7 carbon atoms, and aryl having from about 6 to about 14 carbon atoms, acyl containing about 1 to about 7 carbon atoms, and aroyl containing about 7 to about 11 carbon atoms; $R_2$ is selected from the group consisting of divalent carbonyl and divalent thiocarbonyl, =C=NH, and

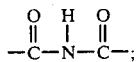

c is from 0 to 2; n is 2 to about 1,000; A is $—NR_1R_3$, where $R_3$ has the same values as $R_1$, and $R_1$ and $R_3$ can be the same or different; $R_4$ has the same values as R, and R and $R_4$ can be the same or different, X' and X'' have the same values as X, and X' and X'' can be the same or different, and where the relationship between R and $R_4$, and X' and X'' is such that when R and $R_4$ are different, X' and X'' are the same, and when R and $R_4$ are the same, X' and X'' are different; and s and t are from about 1 to 10, and s and t can be the same or different.

2. The fire resistant composition as defined in claim 1, wherein R is hydrogen, alkyl, aryl or the chlorinated deterivatives thereof.

3. The fire resistant composition as defined in claim 1, wherein said additive is the homopolymer of formula (a).

4. The fire resistant composition as defined in claim 1, wherein said additive is the copolymer of formula (b).

5. The fire resistant composition as defined in claim 1, wherein said additive is a poly(phosphinohydrazide) having the recurring structural unit:

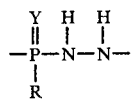

6. The fire resistant composition as defined in claim 1, where said additive is a poly(phosphinoguanide) having the recurring structural unit:

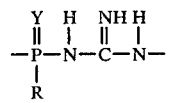

7. The fire resistant composition as defined in claim 5, where R is hydrogen or alkyl.

8. The fire resistant composition as defined in claim 6, where R is hydrogen or alkyl.

9. The fire resistant composition as defined in claim 5, where Y is O or S and R is hydrogen or methyl.

10. The fire resistant composition as defined in claim 6, where Y is O or S and R is hydrogen or methyl.

11. The fire resistant composition as defined in claim 1 said additive is the copolymer having the recurring structural unit;

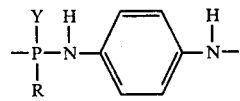

12. The fire resistant composition as defined in claim 1 said additive is the copolymer having the recurring structural unit;

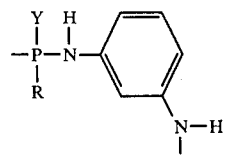

13. The fire resistant composition as defined in claim 1 wherein said additive is the copolymer having the recurring structural unit;

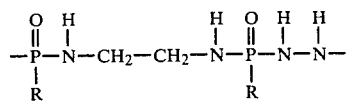

14. The fire resistant composition as defined in claim 1 wherein said additive is the copolymer having the recurring structural unit;

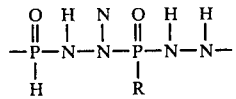

15. The fire resistant composition as defined in claim 1, employing about 5 to about 40 parts of said additive, per 100 parts of said resin, by weight.

16. The fire resistant composition as defined in claim 1, where n is about 2 to about 100.

17. The fire resistant composition as defined in claim 1 wherein said additive is the homopolymer having the recurring structural unit:

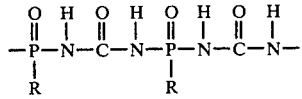

18. A fire resistant composition having low thermal conductivity, comprising a mixture of a polyimide resin, and a polymeric phosphorylated amide as an additive, said additive being solublized in said resin and ultimately providing a homogeneous composition capable of being permanently bonded to a structural substrate to improve char characteristics and provide low thermal conductivity thereto and to permit such substrate to maintain structural integrity thereof when employed in an amount sufficient to form a stable resin char upon being heated to an elevated temperature of about 2,000 degrees F., said polymeric phosphorylated amide being selected from the group consisting of homopolymers and copolymers having the following general formulas, respectively:

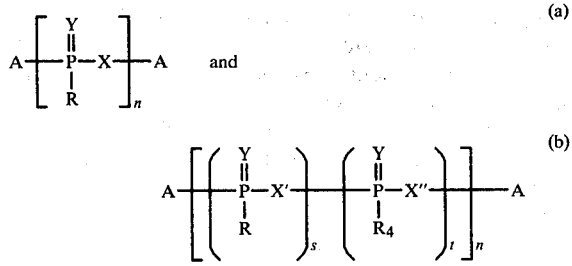

where Y is O or S; and R is selected from the group consisting of H, alkyl containing from about 1 to about 6 carbon atoms, cycloalkyl containing from about 5 to about 7 carbon atoms, aryl containing from about 6 to about 14 carbon atoms, the corresponding halogenated alkyl and aryl groups, nitroaryl containing about 6 to about 14 carbon atoms, heterocyclic containing 5 to 6 members in the heterocyclic nucleus, and O,N or S as hetero atoms, amino, alkylamino containing from about 1 to about 8 carbon atoms in the alkyl group, arylamino containing from about 6 to about 14 carbon atoms, oxyalkyl containing from about 1 to about 4 carbon atoms, and oxyaryl containing about 6 to about 14 carbon atoms; X is selected from the groups consisting of —HN— and

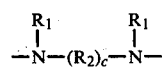

where $R_1$ selected from the group consisting of H, alkyl with straight chain or branched chain and having from about 1 to about 6 carbon atoms, cycloalkyl having from about 5 to about 7 carbon atoms, and aryl having from about 6 to about 14 carbon atoms, acyl containing about 1 to about 7 carbon atoms, and aroyl containing about 7 to about 11 carbon atoms; $R_2$ selected from the group consisting of divalent carbonyl and divalent thiocarbonyl, =C=NH, and

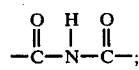

c is from 0 to 2; n is 2 to about 1,000; A is —$NH_1R_3$, where $R_3$ has the same values as $R_1$, and $R_1$ and $R_3$ can be the same or different; $R_4$ has the same values as R, and R and $R_4$ can be the same or different, X' and X" have the same values as X, and X' and X" can be the same or different, and where the relationship between R and $R_4$, and X' and X" is such that when R and $R_4$ are different, X' and X" are the same, and when R and $R_4$ are the same, X' and X" are different; and s and t are from about 1 to 10, and s and t can be the same or different.

19. The fire resistant composition as defined in claim 18, wherein R is hydrogen, alkyl, aryl or the chlorinated derivatives thereof.

20. The fire resistant composition as defined in claim 18, wherein said additive is the homopolymer of formula (a).

21. The fire resistant composition as defined in claim 18, wherein said additive is the copolymer of formula (b).

22. The fire resistant composition defined in claim 18, wherein said additive is a poly(phosphinohydrazide) having the recurring structural unit:

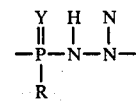

23. The fire resistant composition defined in claim 18, wherein said additive is a poly(phosphinoguanide) having the recurring structural unit:

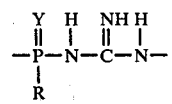

24. The fire resistant composition as defined in claim 22, where R is hydrogen or alkyl.

25. The fire resistant composition as defined in claim 23, where R is a hydrogen or alkyl.

26. The fire resistant composition as defined in claim 22, where Y is O or S and R is hydrogen or methyl.

27. The fire resistant composition as defined in claim 23, where Y is O or S and R is hydrogen or methyl.

28. The fire resistant composition as defined in claim 18, said additive is the copolymer having the recurring structural unit;

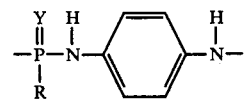

29. The fire resistant composition as defined in claim 18, said additive is the copolymer having the recurring structural unit;

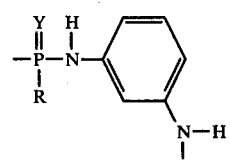

30. The fire resistant composition as defined in claim 18, wherein said additive is the copolymer having the recurring structural unit:

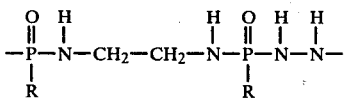

31. The fire resistant composition as defined in claim 30, where R is methyl.

32. The fire resistant composition as defined in claim 18, wherein said additive is the copolymer having the recurring structural unit:

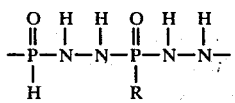

33. The fire resistant composition as defined in claim 32, where R is methyl.

34. The fire resistant composition as defined in claim 18, employing about 5 to about 40 parts of said additive, per 100 parts of said resin, by weight.

35. The fire resistant composition as defined in claim 18, where n is about 2 to about 100.

36. The fire resistant composition as defined in claim 18 wherein said additive is the homopolymer having the recurring structural unit:

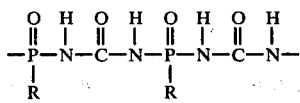

37. A fire resistant composition having low thermal conductivity, comprising a cured mixture of a resin and a polymeric phosphorylated amide as an additive produced by reaction of said resin and said amide at elevated temperature; and which resin is selected so that it has the following properties and characteristics: (1) the additive is soluble in the resin prior to curing and (2) when reacted with the additive such resin will form a stable resin char when heated to an elevated temperature of about 2000° F. and (3) the fire resistance of the resin is increased and its thermal conductivity is decreased when reacted with the additive and so heated; said resin and additive being capable of forming a homogenous composition and of being permanently bonded to a structural substrate to improve char characteristics and provide low thermal conductivity thereto and to permit such substrate to maintain structural integrity thereof when employed in an amount sufficient to form said stable resin char and when heated to an elevated temperature of about 2,000 degrees F.; said polymeric phosphorylated amide being selected from the group consisting of homopolymers and copolymers having the following general formulas, respectively:

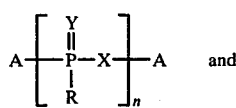 and

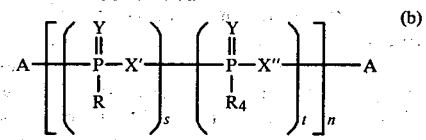

where Y is O or S; and R is selected from the group consisting of H, alkyl containing from about 1 to about 6 carbon atoms, cycloalkyl containing from about 5 to about 7 carbon atoms, aryl containing from about 6 to about 14 carbon atoms, the corresponding halogenated alkyl and aryl groups, nitroaryl containing about 6 to about 14 carbon atoms, heterocyclic containing 5 to 6 members in the heterocyclic nucleus, and O,N or S as hetero atoms, amino, alkylamino containing from about 1 to about 8 carbon atoms in the alkyl group, arylamino containing from about 6 to about 14 carbon atoms, oxyalkyl containing from about 1 to about 4 carbon atoms, and oxyaryl containing about 6 to about 14 carbon atoms; X is selected from the group consisting of —HN— and

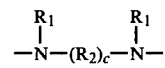

where $R_1$ is selected from the group consisting of H, alkyl with straight chain or branched chain and having from about 1 to about 6 carbon atoms, cycloalkyl having from about 5 to about 7 carbon atoms, and aryl having from about 6 to about 14 carbon atoms, acyl containing about 1 to about 7 carbon atoms, and aroyl containing about 7 to about 11 carbon atoms; $R_2$ is selected from the group consisting of divalent carbonyl and divalent thiocarbonyl, =C=NH, and

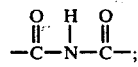

c is from 0 to 2; n is 2 to about 1,000; A is —NR$_1$R$_3$, where R$_3$ has the same values as R$_1$, and R$_1$ and R$_3$ can be the same or different; R$_4$ has the same values as R, and R and R$_4$ can be the same or different, X' and X" have the same values as X, and X' and X" can be the same or different, and where the relationship between R and R$_4$, and X' and X" is such that when R and R$_4$ are different, X' and X" are the same, and when R and R$_4$ are the same, X' and X" are different; and s and t are from about 1 to 10, and s and t can be the same or different.

38. The fire resistant composition as defined in claim 37, wherein R is hydrogen, alkyl, aryl or the chlorinated derivatives thereof.

39. The fire resistant composition as defined in claim 37, wherein said additive is the homopolymer of formula (a).

40. The fire resistant composition as defined in claim 37, wherein said additive is the copolymer of formula (b).

41. The fire resistant composition as defined in claim 37, wherein said additive is a poly (phosphinohydrazide) having the recurring structural unit:

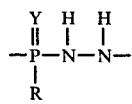

42. The fire resistant composition as defined in claim 37, wherein said additive is a poly (phosphinoguanide) having the recurring structural unit:

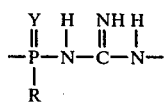

43. The fire resistant composition as defined in claim 41, where R is hydrogen or alkyl.

44. The fire resistant composition as defined in claim 42, where R is hydrogen or alkyl.

45. The fire resistant composition as defined in claim 41, where Y is O or S and R is hydrogen or methyl.

46. The fire resistant composition as defined in claim 42, where Y is O or S and R is hydrogen or methyl.

47. The fire resistant composition as defined in claim 37, said additive is the copolymer having the recurring structural unit:

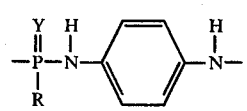

48. The fire resistant composition as defined in claim 37, said additive is the copolymer having the recurring structural unit:

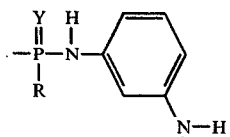

49. The fire resistant composition as defined in claim 37, wherein said additive is the copolymer having the recurring structural unit:

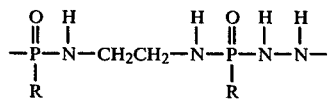

50. The fire resistant composition as defined in claim 37, wherein said additive is the copolymer having the recurring structural unit:

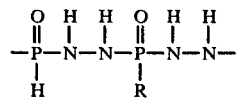

51. The fire resistant composition as defined in claim 37, employing about 5 to about 40 parts of said additive, per 100 parts of said resin, by weight.

52. The fire resistant composition as defined in claim 37, where n is about 1 to about 100.

53. The fire resistant composition as defined in claim 49, where R is methyl.

54. The fire resistant composition as defined in claim 50, where R is methyl.

55. The fire resistant composition as defined in claim 37 wherein said additive is the homopolymer having the recurring structural unit:

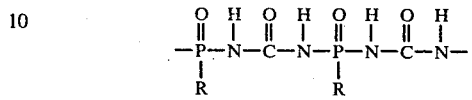

56. The fire resistant composition as defined in claim 37, said resin being a polyimide resin.

57. The fire resistant composition as defined in claim 37, said resin being an epoxy resin.

58. The fire resistant composition as defined in claim 37, said resin being a phenolic resin.

59. The fire resistant composition as defined in claim 37, said resin being a silicone resin.

60. The fire resistant composition as defined in claim 37, said resin being a polybenzimidazole resin.

61. A fire resistant composition having low thermal conductivity, comprising a mixture of a phenolic resin, and a polymeric phosphorylated amide as an additive, said additive being solublized in said resin and ultimately providing a homogeneous composition capable of being permanently bonded to a structural substrate to improve char characteristics and provide low thermal conductivity thereto and to permit such substrate to maintain structural integrity thereof when employed in an amount sufficient to form a stable resin char upon being heated to an elevated temperature of about 2,000° F., said polymeric phosphorylated amide being selected from the group consisting of homopolymers and copolymers having the following general formulas, respectively:

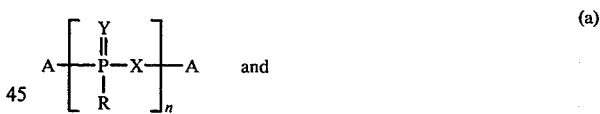

(a)

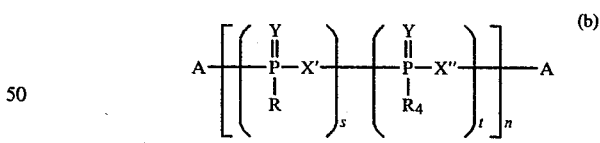

(b)

where Y is O or S; and R is selected from the group consisting of H, alkyl containing from about 1 to about 6 carbon atoms, cycloalkyl containing from about 5 to about 7 carbon atoms, aryl containing from about 6 to about 14 carbon atoms, the corresponding halogenated alkyl and aryl groups, nitroaryl containing about 6 to about 14 carbon atoms, heterocyclic containing 5 to 6 members in the heterocyclic nucleus, and O,N or S as hetero atoms, amino, alkylamino containing from about 1 to about 8 carbon atoms in the alkyl group, arylamino containing from about 6 to about 14 carbon atoms, oxyalkyl containing from about 1 to about 4 carbon atoms, and oxyaryl containing about 6 to about 14 carbon atoms; X is selected from the groups consisting of —HN— and

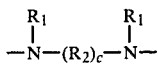

where $R_1$ selected from the group consisting of H, alkyl with straight chain or branched chain and having from about 1 to about 6 carbon atoms, cycloalkyl having from about 5 to about 7 carbon atoms, and aryl having from about 6 to about 14 carbon atoms, acyl containing about 1 to about 7 carbon atoms, and aroyl containing about 7 to about 11 carbon atoms; $R_2$ selected from the group consisting of divalent carbonyl and divalent thiocarbonyl, $=C=NH$, and

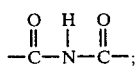

c is from 0 to 2; n is 2 to about 1,000; A is $-NR_1R_3$, where $R_3$ has the same values as $R_1$, and $R_1$ and $R_3$ can be the same or different; $R_4$ has the same values as R, and R and $R_4$ can be the same or different, X' and X" have the same values as X, and X' and X" can be the same or different, and where the relationship between R and $R_4$, and X' and X" is such that when R and $R_4$ are different, X' and X" are the same, and when R and $R_4$ are the same, X' and X" are different; and s and t are from about 1 to 10, and s and t can be the same or different.

62. A fire resistant composition having low thermal conductivity, comprising a mixture of a silicone resin, and a polymeric phosphorylated amide as an additive, said additive being solublized in said resin and ultimately providing a homogeneous composition capable of being permanently bonded to a structural substrate to improve char characteristics and provide low thermal conductivity thereto and to permit such substrate to maintain structural integrity thereof when employed in an amount sufficient to form a stable resin char upon being heated to an elevated temperature of about 2,000 degrees F., said polymeric phosphorylated amide being selected from the group consisting of homopolymers and copolymers having the following general formulas, respectively:

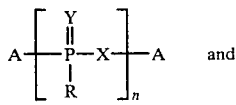

and

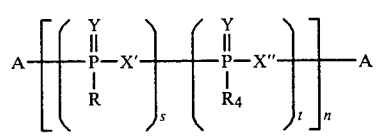

where Y is O or S; and R is selected from the group consisting of H, alkyl containing from about 1 to about 6 carbon atoms, cycloalkyl containing from about 5 to about 7 carbon atoms, aryl containing from about 6 to about 14 carbon atoms, the corresponding halogenated alkyl and aryl groups, nitroaryl containing about 6 to about 14 carbon atoms, heterocyclic containing 5 to 6 members in the heterocyclic nucleus, and O,N or S as hetero atoms, amino, alkylamino containing from about 1 to about 8 carbon atoms in the alkyl group, arylamino containing from about 6 to about 14 carbon atoms, oxyalkyl containing from about 1 to about 4 carbon atoms, and oxyaryl containing about 6 to about 14 carbon atoms; X is selected from the groups consisting of —HN— and

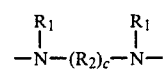

where $R_1$ selected from the group consisting of H, alkyl with straight chain or branched chain and having from about 1 to about 6 carbon atoms, cycloalkyl having from about 5 to about 7 carbon atoms, and aryl having from about 6 to about 14 carbon atoms, acyl containing about 1 to about 7 carbon atoms, and aroyl containing about 7 to about 11 carbon atoms; $R_2$ selected from the group consisting of divalent carbonyl and divalent thiocarbonyl, $=C=NH$, and

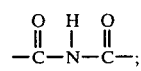

c is from 0 to 2; n is 2 to about 1,000; A is $-NR_1R_3$, where $R_3$ has the same values as $R_1$, and $R_1$ and $R_3$ can be the same or different; $R_4$ has the same values as R, and R and $R_4$ can be the same or different, X' and X" have the same values as X, and X' and X" can be the same or different, and where the relationship between R and $R_4$, and X' and X" is such that when R and $R_4$ are different, X' and X" are the same, and when R and $R_4$ are the same, X' and X" are different; and s and t are from about 1 to 10, and s and t can be the same or different.

63. A fire resistant composition having low thermal conductivity, comprising a mixture of a polybenzimidazole resin, and a polymeric phosphorylated amide as an additive, said additive being solublized in said resin and ultimately providing a homogeneous composition capable of being permanently bonded to a structural substrate to improve char characteristics and provide low thermal conductivity thereto and to permit such substrate to maintain structural integrity thereof when employed in an amount sufficient to form a stable resin char upon being heated to an elevated temperature of about 2,000 degrees F., said polymeric phosphorylated amide being selected from the group consisting of homopolymers and copolymers having the following general formulas, respectively:

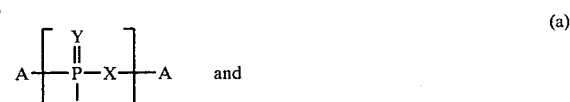

and

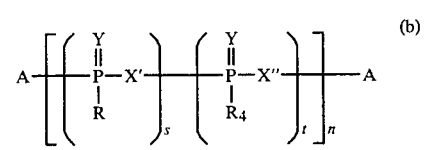

where Y is O or S; and R is selected from the group consisting of H, alkyl containing from about 1 to about 6 carbon atoms, cycloalkyl containing from about 5 to about 7 carbon atoms, aryl containing from about 6 to about 14 carbon atoms, the corresponding halogenated alkyl and aryl groups, nitroaryl containing about 6 to about 14 carbon atoms, heterocyclic containing 5 to 6 members in the heterocyclic nucleus, and O,N or S as hetero atoms, amino, alkylamino containing from about 1 to about 8 carbon atoms in the alkyl group, arylamino containing from about 6 to about 14 carbon atoms, oxyalkyl containing from about 1 to about 4 carbon atoms, and oxyaryl containing about 6 to about 14 carbon atoms; X is selected from the groups consisting of —HN— and

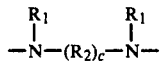

where $R_1$ selected from the group consisting of H, alkyl with straight chain or branched chain and having from about 1 to about 6 carbon atoms, cycloalkyl having from about 5 to about 7 carbon atoms, and aryl having from about 6 to about 14 carbon atoms, acyl containing about 1 to about 7 carbon atoms, and aroyl containing about 7 to about 11 carbon atoms; $R_2$ selected from the group consisting of divalent carbonyl and divalent thiocarbonyl, =C=NH, and

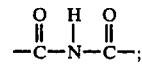

c is from 0 to 2; n is 2 to about 1,000; A is $-NR_1R_3$, where $R_3$ has the same values as $R_1$, and $R_1$ and $R_3$ can be the same or different; $R_4$ has the same values as R, and R and $R_4$ can be the same or different, X' and X" have the same values as X, and X' and X" can be the same or different, and where the relationship between R and $R_4$, and X' and X" is such that when R and $R_4$ are different, X' and X" are the same, and when R and $R_4$ are the same, X' and X" are different; and s and t are from about 1 to 10, and s and t can be the same or different.

* * * * *